March 29, 1938.  I. F. DAVIDSON  2,112,559
STEERING DEVICE FOR POWER PROPELLED VEHICLES
Filed Oct. 30, 1935  2 Sheets—Sheet 1
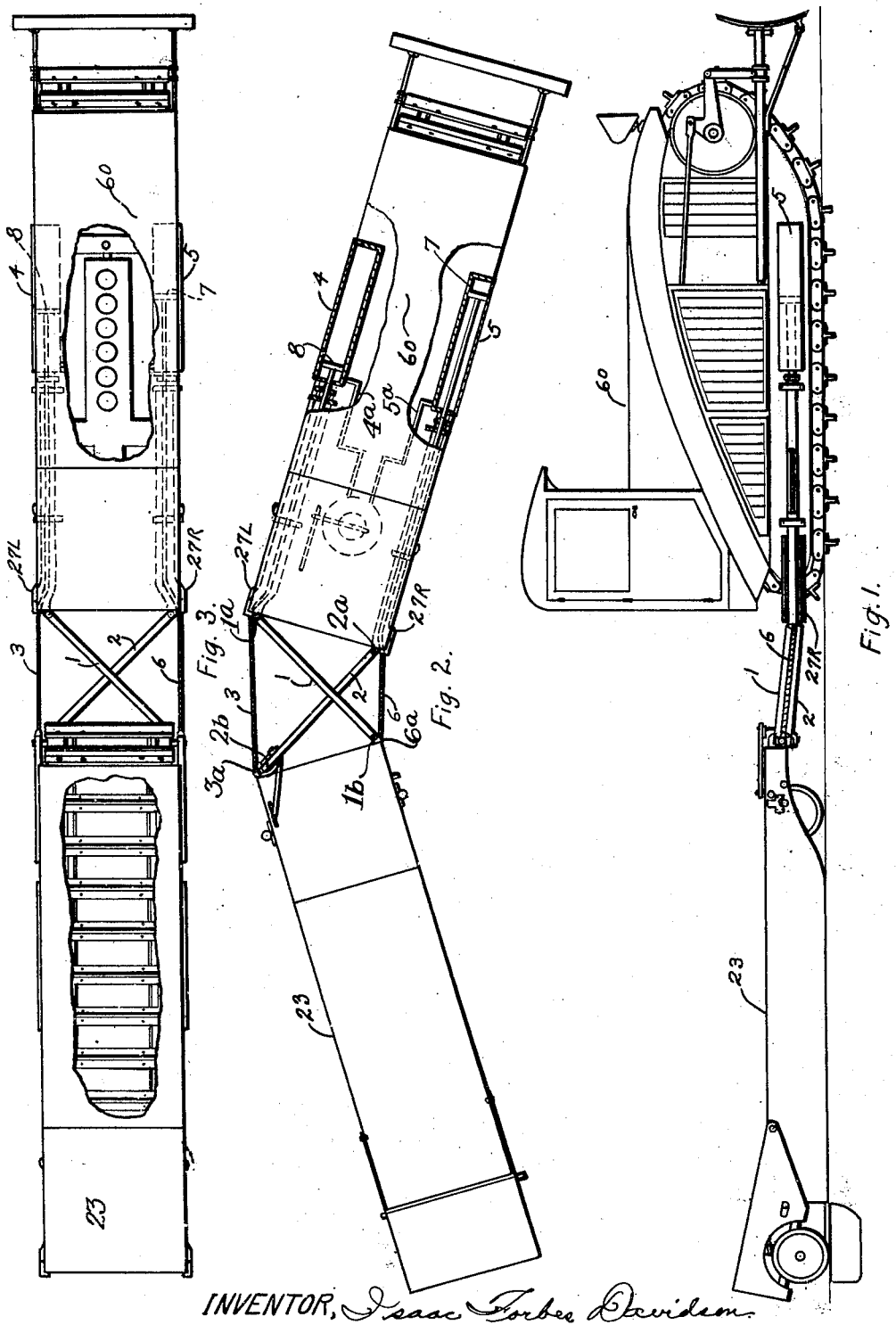
INVENTOR, Isaac Forbes Davidson

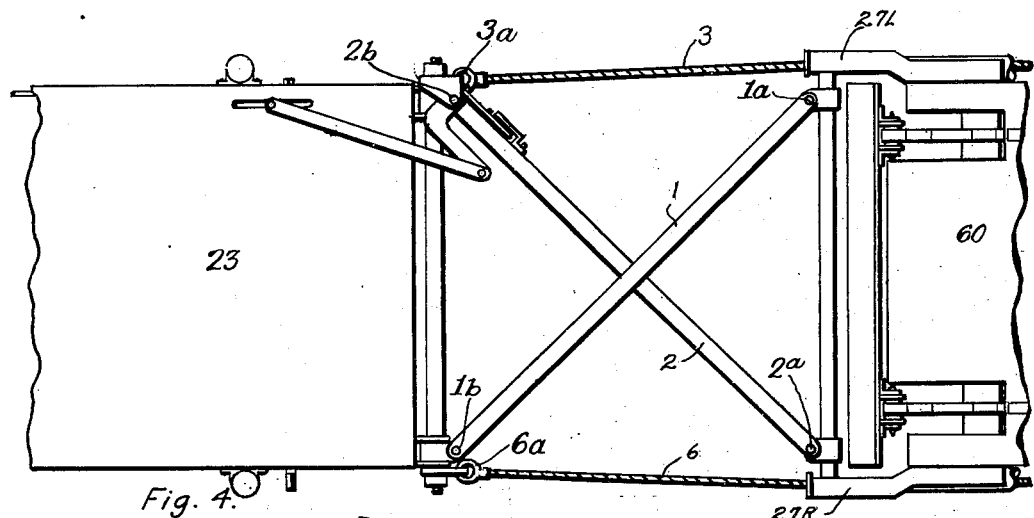
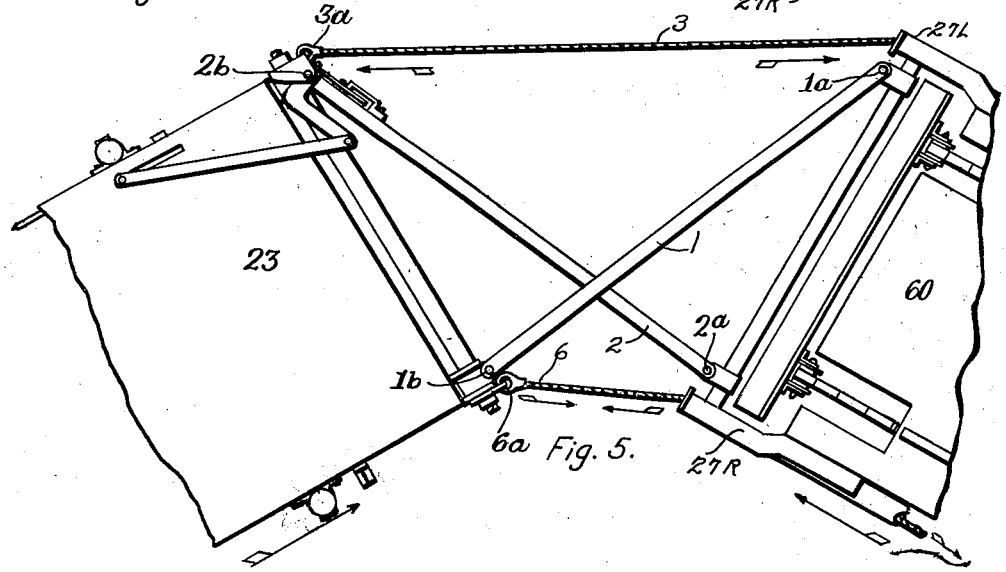

Patented Mar. 29, 1938

2,112,559

UNITED STATES PATENT OFFICE 2,112,559

STEERING DEVICE FOR POWER PROPELLED VEHICLES

Isaac Forbes Davidson, Junction City, Oreg.

Application October 30, 1935, Serial No. 47,467

3 Claims. (Cl. 280—33.5)

REISSUED
APR 1 - 1941

The invention relates to the improvement in steering devices and is to provide a suitable method of steering power driven vehicles over the snow by using a sled or other accompanying vehicle as a rudder to steer the entire unit. Manual or motor power is applied to the steering device, which causes the power driven vehicle to be turned in any direction desired in much the same manner as a rudder steers a boat in the water.

This method allows the power driven vehicle to exert its full traction power to propel the accompanying vehicle as the turning effect is not derived from the contact of the tread of the power driven vehicle with the snow.

Fig. 1 shows a side view of tractor and a trailer sled which are coupled together with a flexible hitch which allows the tractor to be steered in any direction by the sled which is used as a rudder in much the same way as a rudder is used on a boat.

Fig. 2 shows a plan view of the tractor and trailer sled which are coupled together with the flexible steering hitch that is turning the tractor in a moderate right hand turn.

Fig. 3 shows a plan view of two tractors coupled in tandem fashion by the steering hitch. This allows the rear tractor to force the front tractor to turn any time the hitch is used to move the tractors out of a direct line of travel and also to let the front tractor pull the rear tractor around a turn when making a turn. This is a more positive action than when using a sled for a rudder.

Fig. 4 is an enlarged plan view of the hitch showing details of the various mechanisms necessary to perform all steering operations; and Fig. 5 is a plan view similar to Fig. 4 but showing the position of the hitch during a steering operation.

In plan view of Fig. 2 is shown the draw bars 1 and 2 which either push or pull the sled. These bars are of equal length and are attached to the tractor 60 and sled 23 by universal joints 1a, 1b and 2a, 2b, respectively which allow a movement of the bars in any direction required in turning or passing over uneven road surfaces.

One end of a cable 3 is fastened securely to the forward end at the left side of sled 23 at the point 3a and the other end of cable 3 is connected to a piston rod in a hydraulic cylinder 4 on left side of tractor 60. The cable 3 passes through guide tube 27L on rear left side of tractor 60.

A similar cable 6, connected to the sled at the point 6a, guide tube 27R and cylinder 5 are similarly mounted on right side of tractor 60 and sled 23. In traveling over snow the tractor sinks deep enough to make a track or channel for the sled to follow in. The sled is drawn along in the same track and is used as a rudder to steer the tractor as the sled cannot move sideways to any great extent on account of the sides of the sled coming in contact with sides of the channel made by the tractor.

In Fig. 2 the piston 7, which is connected to the forward end of the cable 6, has been forced forward by hydraulic pressure created in the cylinder 5 in which the piston 7 is located, such hydraulic pressure being created by fluid forced into the cylinder 5 thru the pipe 5a; and simultaneously, the piston 8 of the cylinder 4, to which piston the forward end of cable 3 is connected, has been allowed to be pulled backward by permitting the fluid in the cylinder 4 to pass out thru the pipe 4a. The result of the pulling forward or tightening of cable 6 and the slackening of cable 3, is to bring the right front end of the sled 23 and the right rear end of the tractor 60 closer together. As this takes place, pressure is exerted on bar 1 in a forward direction, and, as this bar is connected at its forward end to the left side of the tractor 60, a pressure is exerted forward and outward on the left rear of the tractor 60.

Bar 2 is at the same time exerting a pressure outward and backward on the left side of the sled. As the forces exerted on the rear end of the tractor are forward on the left side and backward on the right side it will force the tractor to turn or pivot in about its bottom center and its direction of travel is then changed as desired by a pull on cable 6.

The turns to the left are made in a similar manner by forcing the piston 8 forward and permitting piston 7 to move backward. The flow and exhaust of the fluid into and from the cylinders 5 and 4 is controlled manually by any of the well-known valves and accessories incidental to hydraulic systems (but the means of control is not shown in the drawings).

The closer the sides of the tractor and sled are moved together the shorter will be the turn in the direction the turn is being made.

This steering device can also be used to guide two tractors that are coupled tandem fashion and both tractors pull continuously in making all turns.

What I claim is:

1. In combination with a pair of vehicles in tandem arrangement, a hitch for connecting the rear end of the forward vehicle to the forward end of the rear vehicle, said hitch including a pair of cross rods of equal length, each of said rods joining the forward end of the rear vehicle at one side to the rear end of the forward vehicle at the opposite side, flexible connecting means connecting said forward and rear vehicles on each side, and means associated with said flexible connecting means for decreasing the distance between the forward end of the rear vehicle and the rear end of the forward vehicle on one side while permitting said distance to be increased on the other side.

2. The combination described by claim 1 with the connections between said rods and said vehicles constituting universal joints.

3. The combination of a track laying tractor, a vehicle behind said tractor and in tandem relation with it, and a hitch between said vehicle and said tractor, said hitch including a pair of cross rods of approximately equal length connecting the forward ends of said vehicle and the rear ends of said tractor at opposite sides, flexible means connecting said tractor and said vehicle on each side, and means associated with said flexible connecting means whereby the distance between said tractor and said vehicle may be made shorter on one side than on the other and thus cause said tractor and said vehicle to turn with respect to each other.

ISAAC FORBES DAVIDSON.